Sept. 7, 1937.   A. JELTSCH ET AL   2,092,073

PRODUCTION OF AMMONIUM SULPHATE IN THE FORM OF SCALES

Filed June 7, 1935

Arnold Jeltsch
Anton Strzyzewski   INVENTORS

BY

ATTORNEY

Patented Sept. 7, 1937

2,092,073

UNITED STATES PATENT OFFICE 2,092,073

PRODUCTION OF AMMONIUM SULPHATE IN THE FORM OF SCALES

Arnold Jeltsch and Anton Strzyzewski, Leuna, Germany, assignors to I. G. Farbenindustrie Aktiengesellschaft, Frankfort - on - the - Main, Germany Application June 7, 1935, Serial No. 25,424
In Germany June 9, 1934

6 Claims. (Cl. 23—119)

The present invention relates to a process of producing ammonium sulphate in the form of scales.

In the manufacture of ammonium sulphate for fertilizing purposes special care must be taken to ensure that the salt has a good capacity for being stored and strewn, i. e. that the salt must not conglomerate during long period of storage at varying temperature and with varying moisture content of the air in the storage chamber and under a more or less strong pressure, but must readily break up again into its single crystal grains.

It is already known that coarsely crystalline ammonium sulphate having a lengthy crystal form has a better capacity for being stored than finely grained salt consisting of almost cubical crystals. It is known that this property is dependent on the number and size of the hollow spaces existing between the single grains of the stored mass, the so-called pore-volume. The greater the pore volume is, the smaller the surface of contact between one crystal and another. At these contact surfaces the conglomeration of the crystals takes place due to the evaporation of adherent mother liquor and the simultaneous crystallization of small crystal needles.

Various processes have already been proposed for the preparation of coarsely crystalline ammonium sulphate of an elongated shape. For example, it has been proposed to add to the solution of ammonium sulphate to be evaporated a certain amount of free sulphuric acid and iron or aluminium or chromium in the form of soluble salts. In order to obtain the desired crystal form in this process, the presence of a definite amount of free sulphuric acid, not too small, is emphasized as being especially important.

Another proposal for obtaining elongated crystal grains consists in working in an alkaline medium and in the presence, for example, of dissolved chromium compounds. The crystal form and the pore volume of the product are similar to those in the before-mentioned process.

We have now found that an ammonium sulphate having a very great pore volume and an excellent capacity for being stored is obtained by carrying out the crystallization in the presence of dissolved aluminium salts in an amount of from about 0.003 to 0.7 parts per thousand parts (calculated as $Al_2O_3$) of the dissolved ammonium sulphate while maintaining in the solution a pH value of from about 5.8 to 7. In this manner tabular crystals are obtained which have the form of leaflets or scales approximately regularly hexagon shaped, about 1 to 5 millimeters in diameter and about 0.05 to 0.6 millimeter thick.

It is quite surprising that the flat scale-like crystals of ammonium sulphate prepared according to this invention have an excellent capacity for storage, because it would properly be assumed that by reason of the large flat surfaces the superposition of the crystals and consequently their conglomeration would be considerably favored.

At a lower pH value, such as from about 2 to 3, i. e. in the presence of free sulphuric acid, the prismatic form is again obtained instead of the scale-like form, while at a higher pH value than 7 the aluminium salt is no longer effective because it is precipitated.

According to this invention, therefore, aluminium salt and acid or base are added to the ammonium sulphate solution in such amounts that the specified conditions prevail during the crystallization. The amount of added aluminium salt and the pH value of the solution within the said ranges are preferably adapted to each other.

In the case of a displacement of the concentration, a correction of the aluminium content or of the hydrogen ion concentration may be carried out during the crystallization of the ammonium sulphate if necessary.

The following example will further illustrate how the said invention may be carried out in practice, but the invention is not restricted to this example.

Example

An ammonium sulphate solution containing about 500 grams of ammonium sulphate per liter is evaporated in a simplex evaporator working at practically normal pressure, until the ammonium sulphate is precipitated. The solution thus evaporated has previously had added to it 0.02 per cent of aluminium oxide (calculated with reference to the ammonium sulphate) in the form of an aluminium sulphate solution obtained by the decomposition of bauxite free from iron by means of sulphuric acid. The hydrogen ion concentration of the ammonium sulphate solution is so adjusted before the beginning of the evaporation that the mother liquor in contact with the deposited salt in the evaporator has a pH value of from about 6.0 to 6.8.

Figure 1:
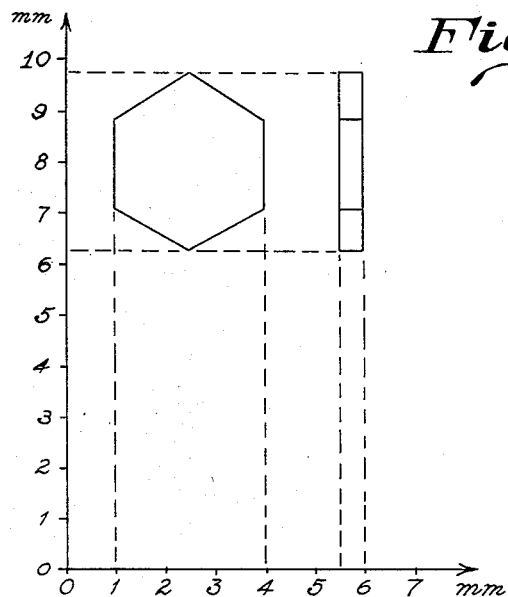
Fig. 1 shows a cross-section and side elevation of a crystal of the preferred type obtained by our process.

The ammonium sulphate obtained by centrifuging the mother liquor has the form of hexagonal, flat leaflets (scales) as shown in Figure 1 of the accompanying drawing.

A sample of the air-dried salt has, after having been shaken down ten times for a short time on each occasion, a shaking weight of about 700 grams per liter. The pore volume amounts to about 60 per cent.

Figure 2:
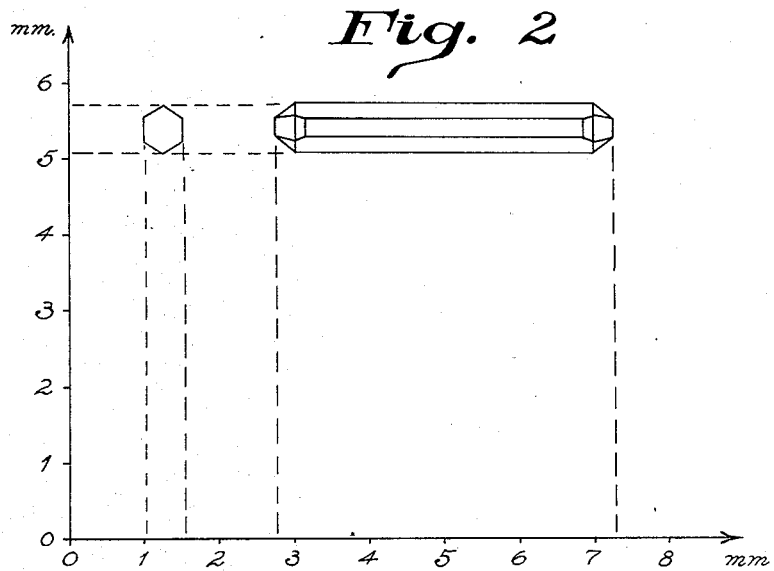
Fig. 2 shows a cross-section and side elevation of a crystal of less desirable type, such as will be obtained by our process if the hydrogen ion concentration of the mother liquor is kept too high, i. e. at a pH value of 5.5 or less.

If, with the same method of evaporation and the same amount of added aluminium salt, the hydrogen ion concentration of the solution to be evaporated be adjusted so that the mother liquor has a pH value of 5.5 or less, elongated crystals as shown in Figure 2 of the accompanying drawing are obtained. An air-dried sample has a shaking weight of 860 grams per liter and the pore volume amounts to about 50 per cent.

Finally, by working under the same conditions and with the said hydrogen ion concentrations but without the addition of aluminium salt, crystals are obtained having an approximate cubical form, i. e. of about equal length and thickness. The shaking weight is about 950 grams per liter and the pore volume about 45 per cent.

What we claim is:

1. Process for the production of non-caking ammonium sulphate in the form of flat, scale-like crystals consisting in the crystallization of this salt from its aqueous solutions containing a dissolved salt of aluminium in an amount of 0.003 to 0.07 parts per thousand parts (calculated as $Al_2O_3$) of the dissolved ammonium sulphate while maintaining in the solution a pH value in the range of about 5.8 to 7.

2. Process for the production of non-caking ammonium sulphate in the form of flat, scale-like crystals consisting in the crystallization of this salt from its aqueous solutions containing dissolved aluminium sulphate in an amount of 0.003 to 0.7 parts per thousand parts (calculated as $Al_2O_3$) of the dissolved ammonium sulphate while maintaining in the solution a pH value in the range of about 5.8 to 7.

3. Process for the production of non-caking ammonium sulphate in the form of flat, scale-like crystals consisting in the crystallization of this salt from its aqueous solutions containing dissolved aluminium sulphate in an amount of about 0.2 parts per thousands parts (calculated as $Al_2O_3$) of the dissolved ammonium sulphate while maintaining in the solution a pH value in the range of about 5.8 to 7.

4. Process for the production of non-caking ammonium sulphate in the form of flat, scale-like crystals consisting in the crystallization of this salt from its aqueous solutions containing a dissolved salt of aluminium in an amount of 0.003 to 0.7 parts per thousand parts (calculated as $Al_2O_3$) of the dissolved ammonium sulphate while maintaining in the solution a pH value in the range of 6.0 to 6.8.

5. Process for the production of non-caking ammonium sulphate in the form of flat, scale-like crystals consisting in the crystallization of this salt from its aqueous solutions containing dissolved aluminium sulphate in an amount of about 0.2 parts per thousand parts (calculated as $Al_2O_3$) of the dissolved ammonium sulphate while maintaining in the solution a pH value in the range of 6.0 to 6.8.

6. Non-caking ammonium sulphate in the form of flat, scale-like approximately regularly hexagon shaped crystals, about 1 to 5 millimeters in diameter and about 0.05 to 0.6 millimeter thick.

ARNOLD JELTSCH.
ANTON STRZYZEWSKI.